United States Patent
Nicholls

(10) Patent No.: US 6,811,943 B2
(45) Date of Patent: Nov. 2, 2004

(54) LIQUID DEVELOPERS

(75) Inventor: Stephen Lansell Nicholls, Willunga (AU)

(73) Assignee: Research Laboratories of Australia Pty Ltd, South Australia (AU)

( * ) Notice: Subject to any disclaimer, the term of this patent is extended or adjusted under 35 U.S.C. 154(b) by 0 days.

(21) Appl. No.: 10/301,459

(22) Filed: Nov. 21, 2002

(65) Prior Publication Data

US 2003/0104304 A1 Jun. 5, 2003

(30) Foreign Application Priority Data

Nov. 26, 2001 (AU) .............................. PR9061

(51) Int. Cl.⁷ .............................................. G03G 9/125
(52) U.S. Cl. ...................................... 430/116; 430/115
(58) Field of Search ............................... 430/112, 113, 430/114, 115, 116

(56) References Cited

U.S. PATENT DOCUMENTS

| | | | | |
|---|---|---|---|---|
| 3,325,409 A | * | 6/1967 | Whitehead | 430/114 |
| 3,878,120 A | * | 4/1975 | Nagashima et al. | 430/113 |
| 4,155,862 A | | 5/1979 | Mohn et al. | |
| 4,476,210 A | | 10/1984 | Croucher et al. | |
| 4,822,710 A | | 4/1989 | Croucher et al. | |
| 5,106,757 A | * | 4/1992 | Muller | 436/162 |

FOREIGN PATENT DOCUMENTS

| | | | |
|---|---|---|---|
| GB | 1526166 | | 6/1977 |
| GB | 1542143 | * | 3/1979 |
| GB | 2109572 A | | 11/1982 |

OTHER PUBLICATIONS

Okuma Akihiro, Capsule Toner, Dec. 21, 1987 (Matsushita Electric), PAJ Abstract, describing JP 62–294261 A.

Matsumoto Tooru, Toner for Static Image and Its Manufacture, Jan. 10, 1979 (Matsumoto Tooru), WPI Abstract, describing JP 54–002743 A.

* cited by examiner

Primary Examiner—Janis L. Dote
(74) Attorney, Agent, or Firm—Klauber & Jackson

(57) ABSTRACT

A toner or developer for electrostatic images including a carrier liquid and insoluble marking particles. The carrier liquid comprises or includes a polybutene. The polybutene may be present in a range of 20 to 98 percent by weight. The carrier liquid can also includes one or a blend of other carrier liquids selected from aliphatic hydrocarbons, aromatic hydrocarbons, chlorinated solvents, silicone fluids and vegetable oils. The insoluble marking particle is present in the range of 2 to 40 percent by weight of the toner or developer.

12 Claims, No Drawings

LIQUID DEVELOPERS

TECHNICAL FIELD

This invention relates to liquid developers suitable for electrostatography.

BACKGROUND ART

Electrostatography is a term used to describe various non-impact printing processes which involve the creation of a visible image by the attraction of charged imaging particles or marking particles to charge sites present on a substrate. Such charge sites, forming what is usually termed a latent image can be transiently supported on photoconductors or pure dielectrics and may be rendered visible in situ or be transferred to another substrate to be developed in that location. Additionally such charged sites may be the reflection of those structured charges existing within a permanently polarised material as in the case with ferroelectrics or other electrets.

Electrostatography encompasses those processes normally known as electrophotography and electrography.

In general, a liquid developer, or toner, for electrostatography is prepared by dispersing an inorganic or organic colourant such as iron oxide, carbon black, nigrosine, phthalocyanine blue, benzidine yellow, quinacridone pink and the like into a liquid vehicle which may contain dissolved or dispersed therein synthetically or naturally occurring polymers such as acrylics, alkyds, rosins, rosin esters, epoxies, polyvinyl acetate, styrene-butadiene etc. Additionally to affect or enhance electrostatic charge on such dispersed particles additives known as charge directors or charge control agents may be included. Such materials can be metallic soaps, fatty acids, lecithin, organic phosphorus compounds, succinimides, sulphosuccinates etc.

In such developers, whether positively or negatively charged, there is one ingredient of common generic character, namely the carrier liquid. Since the beginning of the history of liquid toners, it has been recognised that certain electrical properties of the carrier liquid are mandatory requirements for the effective functioning of a conventional electrostatographic liquid development process. The mandatory requirement is low electrical conductivity but other requirements have also became obvious, such as the need for low toxicity, increased fire safety, low solvent power, low odour etc. For these reasons, isoparaffinic-hydrocarbons such as the ISOPAR® range manufactured by Exxon Corporation, the Shellsol® range manufactured by Shell Chemical and the SOLTROL® range manufactured by Phillips Petroleum have become the industry standards for liquid toner carriers.

In more recent times, however, certain deficiencies in these isoparaffins have become apparent. Environmental concerns have placed liquid development processes under increasing pressure to reduce or eliminate volatile emissions. Flammability has also become important regarding the more stringent transport regulations existing and anticipated worldwide.

New designs of image fusing stations are also placing increased importance on the thermal stability of carrier liquids.

In order to overcome these limitations other materials which may be applicable as carrier liquids for liquid toners have been investigated.

It has surprisingly been found that polybutenes can function as carrier liquids.

In one form therefore the invention is said to reside in a toner or developer for electrostatic images including a carrier liquid and insoluble marking particles characterised by the carrier liquid being a polybutene.

In an alternative form the invention may be said to reside in a liquid toner or developer for electrostatic graphic images characterised by a carrier liquid comprising or including polybutene.

Polybutene is a synthetic hydrocarbon polymer made by the polymerisation of isobutene (also known as "isobutylene"). Another name for polybutene is polyisobutylene. Throughout this specification the term polybutene will be used to refer to this range of compounds.

Polybutenes range from light mobile liquids to extremely viscous gels. Basically the longer the polymer chain is allowed to grow, the higher the viscosity. Polybutenes have many of the characteristics of iso-paraffinic hydrocarbons and non-branched paraffin oils but are classified as a true polymer rather than a hydrocarbon liquid.

The properties of polybutenes which make them of interest in the field of liquid developers for electrostatography include:

1. Polybutenes are free from aromatics and hence are generally regarded as safe.
2. Polybutenes are non-staining and essentially water white in colour.
3. Polybutenes are available in a wide range of viscosities.
4. Polybutenes are chemically very stable with good resistance to oxidation and chemicals at normal temperatures.
5. Polybutenes have a high electrical resistivity.
6. Polybutenes are completely hydrophobic.

It will be seen that by this invention a liquid developer or toner can be proposed which may have a range of viscosities depending upon the required application.

In such liquid developers or toners the polybutene may be present in a range of 20 to 98 percent by weight of the toner.

Blends of other carrier liquids could be used in conjunction with the polybutene carrier liquid. The other carrier liquids may be one or more of aliphatic hydrocarbons, aromatic hydrocarbons, chlorinated solvents, silicone fluids and vegetable oils.

As indicated above the liquid developer or toner may also include an organic or inorganic insoluble marking particle and such a marking particle may be present in the range of 2 to 40 percent.

Marking particles that are insoluble in the carrier liquid may be selected upon their particular proposed end use. Examples of marking particles include inorganic pigments such as carbon blacks, silica, alumina, titanium dioxide, magnetic iron oxide, or organic pigments such as phthalocyanine blue, alkali and reflex blue, phthalocyanine green, diarylide yellow, arylamide yellow, azo and diazo yellow, azo red, rubine toner, quinacridone red, basic dye complexes, lake red, or fluorescent pigments and dyestuffs such as basic dyes and spirit soluble dyes, or combinations thereof. Other materials, as would be understood by those skilled in the art, could be used as marking particles.

The liquid developer or toner may also include a charge control agent to impart or enhance an electrostatic charge on the insoluble particles in the toner or developer. These charge control agents may be selected from metallic soaps, fatty acids, lecithin, organic phosphorus compounds, succinimides, sulphosuccinimides or the like.

The charge control agent may be present in a range of 0.01 to 5 percent by weight of the toner when used.

The liquid developer or toner may also include a dispersant which can be selected, for example, from the SOLSPERSE range of polymeric hyperdispersants including 13940 made by Avecia; amino-silicones including Finish WR1600 made by Wacker Chemicals; polymeric oil additives including PLEXOL made by Rohm and Haas; polymeric petroleum additives including FOA-2 made by Dupont; alkylated poly vinyl pyrrolidones including ANTARON AV220 made by ISP Technologies; multifunctional pigment dispersing agents including DISPERSE AYD 1 made by Elementis DCP Inc.

The dispersant may be present in a range of 0.1 to 20 percent by weight of the toner when used.

Polybutenes range in viscosity from light mobile liquids to extremely viscous grades, and hence may be used for high viscosity or low viscosity type liquid developers. The polybutene carrier liquid may have a range of viscosity from 10 centistokes to 50,000 centistokes at 100° C.

The liquid toner or developer formulation according to this invention may include other components as are known in the art including preservatives, viscosity modifiers and binders.

This then generally describes the invention but to assist with understanding, reference will now be made to examples of liquid toners incorporating polybutylene as the carrier liquid.

The various examples were tested using an electrostatic printer of the type described in patent specification WO095/08792.

EXAMPLE 1

A liquid developer was prepared having the following composition:

| IRGALITE BLUE LGLD | 25 grams |
| EPIKOTE 1001 | 100 grams |

The blue pigment and epoxy resin were blended together at 60° C. using a Buss hot-melt extruder and allowed to cool. The blue pigment and resin composite was then crushed to a coarse powder and added to a 2 litre ceramic ball jar together with:

| Aluminium stearate | 1 gram |
| SOLSPERSE 13940 | 10 grams |
| NAPVIS 07 | 364 grams |

This mixture was then ball milled for 7 days to form a viscous, blue dispersion with a total marking particle content of 25% w/w.

IRGALITE BLUE is a CI Pigment Blue 15:3 made by Ciba Specialty Chemicals Inc. EPIKOTE 1001 is a low molecular weight solid epoxy resin made by Shell Chemicals Aluminium stearate is a thickening agent made by Asia Pacific Specialty Chemicals Limited.

SOLSPERSE 13940 is a polyamine/fatty acid condensation polymer dispersing agent manufactured by Avecia.

NAPVIS 07 is a polyisobutylene manufactured by BP Chemicals and having a viscosity of 13 centistokes at 100° C.

The manufactured toner was found to have a viscosity of 500 mPa.s and an average particle size of 1.1 micrometers.

This toner was used in the printer where a high density image was printed on paper substrate with no background staining.

EXAMPLE 2

A liquid developer was prepared having the following composition:

| IRGALITE BLUE LGLD | 20 grams |
| EPIKOTE 1001 | 80 grams |

The blue pigment and epoxy resin were blended together at 60° C. using a Buss hot-melt extruder and allowed to cool. The blue pigment and resin composite was then crushed to a coarse powder and added to a 2 litre ceramic ball jar together with:

| Aluminium stearate | 1 gram |
| SOLSPERSE 13940 | 10 grams |
| NAPVIS 07 | 389 grams |

This mixture was then ball milled for 7 days to form a viscous, blue dispersion with a total marking particle content of 20% w/w.

The manufactured toner was found to have a viscosity of 440 mPa.s and an average particle size of 1.0 micrometers.

This toner was used in the printer where a high density image was printed on aluminium sheet substrate with no background staining.

EXAMPLE 3

A liquid developer was prepared having the following composition:

| IRGALITE BLUE LGLD | 10 grams |
| EPIKOTE 1001 | 40 grams |

The blue pigment and epoxy resin were blended together at 60° C. using a Buss hot-melt extruder and allowed to cool. The blue pigment and resin composite was then crushed to a coarse powder and added to a 2 litre ceramic ball jar together with:

| Aluminium stearate | 1 gram |
| SOLSPERSE 13940 | 10 grams |
| NAPVIS 07 | 439 grams |

This mixture was then ball milled for 7 days to form a viscous, blue dispersion with a total marking particle content of 10% w/w.

The manufactured toner was found to have a viscosity of 300 mPa.s and an average particle size of 0.9 micrometers.

This toner was used in the printer where a medium density image was printed on aluminium sheet substrate with no background staining.

EXAMPLE 4

A liquid developer was prepared having the following composition:

| | |
|---|---|
| IRGALITE BLUE LGLD | 20 grams |
| EPIKOTE 1001 | 80 grams |

The blue pigment and epoxy resin were blended together at 60° C. using a Buss hot-melt extruder and allowed to cool. The blue pigment and resin composite was then crushed to a coarse powder and added to a 2 litre ceramic ball jar together with:

| | |
|---|---|
| Aluminium stearate | 1 gram |
| SOLSPERSE 13940 | 10 grams |
| NAPVIS 07 | 289 grams |
| ISOPAR L | 100 grams |

This mixture was then ball milled for 7 days to form a viscous, blue dispersion with a total marking particle content of 20% w/w.

ISOPAR L is an isoparaffinic hydrocarbon liquid made by Exxon Chemical.

The manufactured toner was found to have a viscosity of 70 mPa.s and an average particle size of 0.8 micrometers.

This toner was used in the printer where a high density image was printed on aluminium sheet substrate with no background staining.

EXAMPLE 5

A liquid developer was prepared having the following composition:

| | |
|---|---|
| IRGALITE BLUE LGLD | 20 grams |
| EPIKOTE 1001 | 80 grams |

The blue pigment and epoxy resin were blended together at 60° C. using a Buss hot-melt extruder and allowed to cool. The blue pigment and resin composite was then crushed to a coarse powder and added to a 2 litre ceramic ball jar together with:

| | |
|---|---|
| Aluminium stearate | 1 gram |
| SOLSPERSE 13940 | 10 grams |
| HYVIS 2000 | 100 grams |
| ISOPAR L | 289 grams |

This mixture was then ball milled for 7 days to form a viscous, blue dispersion with a total marking particle content of 20% w/w.

HYVIS 2000 is a polyisobutylene manufactured by BP Chemicals and having a viscosity of 40500 centistokes at 100° C.

The manufactured toner was found to have a viscosity of 95 mPa.s and an average particle size of 0.8 micrometers.

This toner was used in the printer where a high density image was printed on aluminium sheet substrate with no background staining.

EXAMPLE 6

A liquid developer was prepared having the following composition:

| | |
|---|---|
| Permanent yellow DHG01 | 20 grams |
| EPIKOTE 1001 | 80 grams |

The yellow pigment and epoxy resin were blended together at 60° C. using a Buss hot-melt extruder and allowed to cool. The yellow pigment and resin composite was then crushed to a coarse powder and added to a 2 litre ceramic ball jar together with:

| | |
|---|---|
| Aluminium stearate | 1 gram |
| SOLSPERSE 13940 | 10 grams |
| NAPVIS 07 | 389 grams |

This mixture was then ball milled for 7 days to form a viscous, yellow dispersion with a total marking particle content of 20% w/w.

Permanent yellow DHG01 is a CI Pigment yellow 12 made by Clariant (Australia) Pty Ltd.

The manufactured toner was found to have a viscosity of 290 mPa.s and an average particle size of 2.0 micrometers.

This toner was used in the printer where a medium density image was printed on aluminium sheet substrate with no background staining.

EXAMPLE 7

A liquid developer was prepared having the following composition:

| | |
|---|---|
| HOSTAPERM pink E | 20 grams |
| EPIKOTE 1001 | 80 grams |

The red pigment and epoxy resin were blended together at 60° C. using a Buss hot-melt extruder and allowed to cool. The red pigment and resin composite was then crushed to a coarse powder and added to a 2 litre ceramic ball jar together with:

| | |
|---|---|
| Aluminium stearate | 1 gram |
| SOLSPERSE 13940 | 10 grams |
| NAPVIS 07 | 389 grams |

This mixture was then ball milled for 7 days to form a viscous, red dispersion with a total marking particle content of 20% w/w.

HOSTAPERM pink E is a CI Pigment red 122 made by Hoechst.

The manufactured toner was found to have a viscosity of 300 mPa.s and an average particle size of 1.0 micrometers.

This toner was used in the printer where a medium density image was printed on aluminium sheet substrate with no background staining.

EXAMPLE 8

| HOSTAPERM Pink E | 20 grams |
|---|---|
| FINE TONE 6694, F | 80 grams |

The red pigment and polyester resin were blended together at 100° C. using a Buss hot-melt extruder and allowed to cool. The red pigment and resin composite was then crushed to a coarse powder and added to a 2 litre ceramic ball jar together with:

| NAPVIS 07 | 400 g |
|---|---|
| Basic Barium Petronate | 2.5 g |

This mixture was then ball milled for 7 days to form a viscous, red dispersion with a total marking particle content of 20% w/w.

Basic Barium Petronate is a charge control agent made by Witco Corporation. FINE TONE 6694 is a polyester resin made by Reichhold Inc.

The manufactured toner was found to have a viscosity of 600 mPa.s and an average particle size of 2.5 micrometers.

This toner was used in the printer where a medium density image was printed on paper substrate with no background staining.

Throughout this specification various indications have been given as to the scope of the invention but the invention is not limited to any one of these but may reside in two or more combined together. The examples are given for illustration only and not for limitation.

Throughout this specification and the claims that follow unless the context requires otherwise, the words 'comprise' and 'include' and variations such as 'comprising' and 'including' will be understood to imply the inclusion of a stated integer or group of integers but not the exclusion of any other integer or group of integers.

What is claimed is:

1. A toner or developer for electrostatic images including a carrier liquid and insoluble marking particles characterised by the carrier liquid comprising or including a polybutene and wherein the polybutene has range of viscosity from 10 centistokes to 50,000 centistokes at 100° C.

2. A toner or developer for electrostatic images as in claim 1 wherein the polybutene is present in a range of 20 to 98 percent by weight.

3. A toner or developer for electrostatic images as in claim 1 wherein the carrier liquid includes one or a blend of other carrier liquids selected from the group consisting of aliphatic hydrocarbons, aromatic hydrocarbons, chlorinated solvents, silicone fluids, and vegetable oils.

4. A toner or developer for electrostatic images as in claim 1 wherein the insoluble marking particle is present in the range of 2 to 40 percent by weight of the toner or developer.

5. A toner or developer for electrostatic images as in claim 1 wherein the insoluble marking particle is selected from the group consisting of inorganic pigments, carbon blacks, silica, alumina, titanium dioxide, magnetic iron oxide, organic pigments such as phthalocyanine blue, alkali and reflex blue, phthalocyanine green, diarylide yellow, arylamide yellow, azo and diazo yellow, azo red, rubine toner, quinacridone red, basic dye complexes, lake red fluorescent pigments, dyestuffs, basic dyes and spirit soluble dyes, and combinations thereof.

6. A toner or developer for electrostatic images as in claim 1 further including a charge control agent to impart or enhance an electrostatic charge on the insoluble particles in the toner or developer.

7. A toner or developer for electrostatic images as in claim 6 wherein the charge control agent is selected from the group consisting of metallic soaps, fatty acids, lecithin, organic phosphorus compounds, succinimides, and sulphosuccinimides.

8. A toner or developer for electrostatic images as in claim 6 wherein the charge control agent is present in a range of 0.01 to 5 percent by weight of the toner or developer.

9. A toner or developer for electrostatic images as in claim 1 further including a dispersant.

10. A toner or developer for electrostatic images as in claim 9 wherein the dispersant is selected from the group consisting of polymeric hyperdispersants, amino-silicones, polymeric oil additives, polymeric petroleum additives, alkylated poly vinyl pyrrolidones, and multi-functional pigment dispersing agents.

11. A toner or developer for electrostatic images as in claim 9 wherein the dispersant is present in a range of 0.1 to 20 percent weight of the toner or developer.

12. A toner or developer for electrostatic images as in claim 1 further including other components selected from the group consisting of preservatives, viscosity modifiers, and binders.

* * * * *